United States Patent [19]

Stutts

[11] Patent Number: 4,462,875

[45] Date of Patent: Jul. 31, 1984

[54] PREPARATION OF NICKEL-OXIDE HYDROXIDE ELECTRODE

[75] Inventor: Kenneth J. Stutts, Midland, Mich.

[73] Assignee: The Dow Chemical Company, Midland, Mich.

[21] Appl. No.: 560,683

[22] Filed: Dec. 12, 1983

[51] Int. Cl.$^3$ ................................................ C25D 9/04
[52] U.S. Cl. ...................................... 204/56 R; 204/96
[58] Field of Search .................................. 204/96, 56 R

[56] References Cited

U.S. PATENT DOCUMENTS

| | | | |
|---|---|---|---|
| 4,184,930 | 1/1980 | Appleby et al. | 204/96 |
| 4,337,124 | 6/1982 | Maskalick | 204/56 R |
| 4,384,928 | 5/1983 | Hall | 204/96 |

OTHER PUBLICATIONS

J. C. S. Perkin II, The Kinetics and Mechanism of the Oxidation of Amines and Alcohols at Oxide-Covered Nickel, Silver, Copper, and Cobalt Electrodes, M. Fleischmann, K. Korinek, D. Pletcher, pp. 1396–1403 (1972).

Electroanalytical Chemistry and Interfacial Electrochemistry, Some Problems of the Kinetics of the Oxidation of Organic Compounds at Oxide-Covered Nickel Electrodes, G. Vertes, G. Horanyi, pp. 47–53 (1974).

Synthesis, Oxidation of Primary Alcohols to Carboxylic Acids at the Nickel Hydroxide Electrode, J. Kaulen, H. J. Shafer, pp. 513–516 (1979).

*Primary Examiner*—R. L. Andrews
*Attorney, Agent, or Firm*—Douglas N. Deline

[57] ABSTRACT

A nickel-oxide hydroxide electrode is prepared by galvanostatic cycling of a nickel metal in contact with a basic electrolyte under electrochemical conditions.

9 Claims, No Drawings

PREPARATION OF NICKEL-OXIDE HYDROXIDE ELECTRODE

BACKGROUND OF THE INVENTION

The present process relates to the preparation of electrodes for use in oxidation processes. More particularly, the present invention relates to the preparation of nickel-oxide hydroxide electrodes by the technique of galvanostatic cycling.

Electrochemically generated nickel-oxide hydroxide electrodes are previously known in the art. Previous processes for preparation thereof involve Kandler deposition of nickel hydroxide layer from a nickel salt solution onto a metal support followed by electrochemical conversion to active nickel-oxide hydroxide in, e.g., caustic electrolyte. The process is well-known having been described in G. Vertes et al., *J. Electroanal. Chem.*, 52, 47 (1974); Kaulen et al., *Synthesis Comm.*, 513 (1979); and other references.

Nickel-oxide hydroxide electrodes are very active and selective for numerous oxidation processes. In particular, the electrodes are useful for the conversion of alcohols to ketones or aldehydes and also carboxylic acids, *J. Electrochem. Soc.*, 124, 203 (1977). As a particular example (poly)alkylene glycols may be converted to the corresponding dicarboxylic acids in high selectivity and current efficiency. The dicarboxylic acids are valuable commercial chelating agents and anticorrosion agents.

It would be desirable to provide a process for preparation of a nickel-oxide hydroxide electrode that does not require the use of a nickel salt solution. Previous processes (Kandler process) require two steps, i.e., treatment of an electrode first with nickel salt solution then with caustic solution. In large scale operations the necessary equipment to perform both steps of the process is both expensive and cumbersome and the process employs toxic nickel salts that are environmentally unacceptable. In addition, the nickel-oxide hydroxide prepared by the Kandler deposition has been found to lack sufficient physical stability for acceptable commercial performance.

SUMMARY OF THE INVENTION

According to the present process an improved nickel-oxide hydroxide electrode is prepared by the steps of:

(1) contacting a nickel metal with a basic electrolyte under electrochemical conditions; and (2) electrolyzing the nickel metal by galvanostatic cycling so as to prepare a surface coating comprising nickel-oxide hydroxide.

Suitable basic electrolytes include aqueous solutions of alkali metal- or ammonium carbonates or hydroxides. A preferred basic electrolyte comprises aqueous alkali metal hydroxide. By the term electrochemical conditions is meant that the nickel metal is connected by means of electrical conductors with an outside electrical source and a counter electrode, which is also in contact with the electrolyte. Either divided or undivided cells may be employed.

Once prepared, the nickel-oxide hydroxide electrode which comprises the nickel metal having a surface coating of nickel-oxide hydroxide is stable for several minutes or even hours. It may be employed in oxidation reactions by merely contacting with the substrate, i.e., alcohol, etc., to be oxidized. Preferably, the nickel-oxide hydroxide is employed electrocatalytically. That is, the electrode is employed as the anode of an electrochemical cell containing base and the substrate to be oxidized in an electrically conductive reaction medium. Under application of a sufficient cell potential, the nickel-oxide hydroxide is continuously regenerated.

DETAILED DESCRIPTION OF THE INVENTION

In the preparation of nickel-oxide hydroxide according to the present process, a nickel metal electrode is contacted with a basic electrolyte such as aqueous alkali metal hydroxide. Upon contact, a thin surface coating of nickel (II) hydroxide forms on the metal. Anodic charging of the nickel metal serves to convert the surface layer to nickel-oxide hydroxide. However, at most this initially formed surface layer is thin, on the order of only a few monolayers of deposited nickel-oxide hydroxide, and not adequate for use in electrochemical oxidation processes over extended time periods. The process of galvanostatic cycling requires that the nickel metal be alternately, anodically then cathodically charged in an electrochemical cell containing a basic electrolyte at a current density in excess of that corresponding to the active voltametric wave of the nickel-oxide hydroxide half cell. Generally, alternate cycling of polarity between the nickel metal as one electrode and a counter electrode at current densities from about 5 mA/cm$^2$ to about 100 mA/cm$^2$ is employed. At current densities less than about 5 mA/cm$^2$, formation of nickel-oxide hydroxide is too slow to form a highly active electrode. At current densities higher than about 100 mA/cm$^2$ damage to the nickel metal may occur. Other factors such as alkali metal hydroxide concentration and the presence of additional solvents in the electrolyte will also affect the choice of optimum current density. Generally, employing aqueous caustic as the electrolyte at a concentration of about 1-2 molar, the above current density range may satisfactorily be employed. A preferred current density range is from about 25 mA/cm$^2$ to about 75 mA/cm$^2$ under the above conditions.

While the counter electrode may be comprised of any suitable material, preferred electrode materials are metals especially stainless steel, platinum or nickel. An especially preferred counter electrode material is nickel thereby allowing the use of either electrode as an active electrode when polarized anodically. This process may be especially beneficial in the fabrication of bipolar cells.

Because the above current densities apply overpotentials to the nickel electrode and counter electrode, each half cell operates into the region of oxygen or hydrogen evolution. Care should be exercised to remove electrogenerated gaseous products from the cell in order to avoid explosive recombination thereof.

After anodic charging of the nickel electrode, the polarity of the cell is reversed and a current applied in reverse direction for an approximately equivalent time period. While any convenient current density may be employed, it is preferred to use about equal current density as that originally applied. Where non-nickel counter electrodes are employed the time periods at reverse polarity may suitably be reduced. Typically for small cells, anodic charging for from about one to about 20 seconds followed by reverse polarizing for about one to about 20 seconds is effective. Preferred are anodic and cathodic polarizations of about 5 to about 15 seconds and 2 to about 5 seconds, respectively. Over a period of about 10 minutes in, e.g., 2 M aqueous NaOH, these time limits serve to produce a layer of NiOOH of exceptionally uniform composition of a thickness of at least about 60 monolayer equivalents. Preferably, the layer of nickel-oxide hydroxide is at least about 100 monolayer/equivalents thick.

The estimation of thickness of deposited layers in the present specification including the examples which follow, is made by coulometric calculation assuming 220 $\mu C/cm^2$ as the equivalent of one monolayer. Alteration of the electrolyte composition, current densities employed and time periods for galvanostatic cycling may serve to modify the thickness of the deposited layer of nickel-oxide hydroxide. As a final step, a longer period of anodic polarization from about 0.5 minute to about 10 minutes, preferably from about 2 minutes to about 5 minutes, may be employed to form a finished layer of nickel-oxide hydroxide of exceptional thickness and uniformity.

In larger scale applications wherein currents of hundreds or thousands of amperes are applied to the electrodes, it may be necessary to lengthen the time periods of the galvanostatic cycle or alternately to ground the electrode between charge applications of opposite polarity in order to prevent dangerous electrical conditions. For example, in commercial applications it may be necessary to employ a galvanic cycle of several hours or even days.

Once prepared the nickel-oxide hydroxide is ready for use in an oxidation process. Suitably the nickel metal containing the surface coating of nickel-oxide hyroxide is contacted with the substrate to be oxidized. Where the oxidation is performed in an electrolytic medium comprising the alcohol or other material to be oxidized and aqueous alkali metal hydroxide, under electrochemical conditions the nickel-oxide hydroxide surface can be regenerated in situ as it is reduced. Operation in such an electrocatalytic manner provides an efficient method for electrochemically oxidizing numerous chemical compounds including alcohols, (poly)alkylene glycols, (poly)alkylene glycol monoethers and aromatic alcohols. Cell potentials on the order of 2.0 volts are normally adequate for the regeneration process, depending on the particular cell design and the electrolyte concentration.

With proper care the electrogenerated nickel-oxide hydroxide surface may be reduced and regenerated in the above process for long periods of time up to several months or even years. The extremely long period of activity is directly related to the depth of nickel-oxide hydroxide originally prepared according to the galvanostatic cycling process.

When the activity and current efficiency of the nickel-oxide hydroxide electrode decrease to unacceptable levels, the electrode is conveniently regenerated by repetition of the same galvanostatic process previously described. For greater convenience, the galvanostatic cycling may be performed in the presence of the alcohol or other compound to be oxidized thereby eliminating the need to later charge the working cell with such compound.

In actual practice an electrolysis cell which may either be divided by a permeable membrane or undivided is fitted with a nickel metal electrode having a surface coating comprised of nickel-oxide hydroxide prepared according to the present invention. The nickel metal may be in any form such as mesh or screen, and may also comprise a nickel alloy such as Raney nickel. It is further suitable to employ an electrode having a surface of nickel such as a nickel-coated steel electrode.

The cell should be equipped with a means of charging various solutions thereto. A pump and associated connecting conduit are one suitable means. The cell may then be filled with an aqueous alkali metal hydroxide electrolyte solution, optionally further containing the material to be oxidized, and the galvanostatic cycling of the nickel electrode commenced. When the desired amount of nickel-oxide hydroxide is prepared the material to be oxidized may then be added to the same electrolyte already present in the cell, if not originally present, or alternatively the initial electrolyte solution may be removed, the electrodes cleaned and new electrolyte containing the material to be oxidized added. Where required, additional solvents may be added to the electrolyte in order to solubilize the material sought to be oxidized.

Recovery of oxidized reaction products is readily accomplished according to standard techniques. Where the oxidation product is a carboxylic acid, the corresponding alkali metal salt is recovered ordinarily by precipitation. The recovery may be continuous if the cell is allowed to operate near the saturation limit for the oxidation product.

The preparation of the nickel-oxide hydroxide electrode and its use occurs at temperatures suited for electrochemical practice. Suitable temperatures are from about 5° C. to about 85° C., preferably from about 10° C. to 75° C.

SPECIFIC EMBODIMENTS

Having described the invention, the following examples are provided as further illustrative and are not to be construed as limiting.

EXAMPLE 1

Nickel XMet (87 cm$^2$) is separated from a stainless steel 304, auxiliary electrode (~90 cm$^2$) with polypropylene netting. This electrode system is cleaned in nitric acid and then rinsed with deionized water. After immersion in 2 M NaOH, a constant current of 2 amps is passed for 10 seconds with the Ni XMet polarized positively. The polarization is then switched for 2 seconds. After 10 minutes treatment by galvanostatic cycling, a 5-minute positive polarization of the Ni XMet at 2 A results in a uniform black coating on the metal surface having an estimated thickness of about 110 monolayers.

The electrodes are disconnected from the galvanostat, washed with deionized water, and then immersed in 200 ml of 2 M NaOH. Diethylene glycol (0.154 mole) is added to the solution with stirring after the Ni XMet is polarized positively at 2 A. After 111,490 Coulombs (C) and 124,300 C of electricity are passed, 10-ml portions of 5 M NaOH are added. The electrolysis is stopped at 130,400 C. The yield of diglycolic acid (via liquid chromatography) is 78 percent, with a current efficiency of 71 percent. No discernible diethylene glycol remains.

EXAMPLE 2

Three sets of nickel electrodes are prepared from a single sheet of nickel metal (Ni XMet). The electrodes are in the form of concentric cylinders. Each set comprises one electrode having a surface area of 20 cm$^2$ and one electrode having a surface area of 36 cm$^2$. The electrodes are placed in clean cells, separated by polypropylene netting, cleaned with consecutive washings of methylene chloride, acetone and deionized water, respectively, and connected to an electrical source.

Electrode set A is not treated by galvanostatic cycling. Instead, the cell containing electrode set A is charged with 40 ml of 2 M NaOH. Electrolysis is begun immediately at a total current of 1 amp (50 mA/cm) with the smaller electrode anodically charged. After 10 seconds, diethylene glycol (0.02 mole) is added to the cell and electrolysis commenced.

Electrode sets B and C are likewise immersed in 40 ml of 2 M NaOH. Prior to energizing the cells, 0.02 mole of diethylene glycol is added. Constant current pulses (1 amp) are applied to the electrodes alternating polarity each 10 seconds for a total treatment lasting 10 minutes. Finally, the smaller electrodes are anodically charged at a total current of 1 amp thereby electrolyzing the diethylene glycol.

The electrolysis is continued until the ratio of charge passed to theoretical charge (assuming 8 Faradays per mole of diglycolic acid) is as further identified in Table I. The cell contents are analyzed by liquid chromatography to determine conversion. Results are contained in Table I.

TABLE I

| Electrode Set | Q/Qt | Diglycolic acid Yield (%) | Current Efficiency (%) |
|---|---|---|---|
| A | 1.95 | 25 | 13 |
| B | 1.10 | 84 | 77 |
| C | 1.05 | 77 | 71 |

Q = charge passed
Qt = theoretical charge
Yield calculated as conversion x selectivity

EXAMPLE 3

The electrode set B, employed in Example 2, is washed with deionized water and stored in air for 18 hours. The set is immersed in 40 ml of 2 M NaOH containing 0.02 mole of diethylene glycol for one hour. After this time period, a current of 1 amp is applied to the electrode set with the electrode of smallest surface area anodically charged. The anode immediately assumes a black surface. After passing 1.08 x theoretical charge, the yield of diglycolic acid is found to be 75 percent, giving a current efficiency of 69 percent.

What is claimed is:

1. A process for preparing a nickel-oxide hydroxide electrode comprising
   (1) contacting a nickel metal with a basic electrolyte under electrochemical conditions, and
   (2) electrolyzing the nickel metal by galvanostatic cycling so as to prepare a surface coating comprising nickel-oxide hydroxide.

2. A process according to claim 1 wherein the basic electrolyte comprises aqueous alkali metal hydroxide.

3. A process according to claim 1 wherein the nickel metal is electrolyzed by galvanostatic cycling at a current density of from about 5 mA/cm$^2$ to about 100 mA/cm$^2$.

4. A process according to claim 1 wherein the galvanostatic cycling is at a current from about 25 mA/cm$^2$ to about 75 mA/cm$^2$.

5. A process according to claim 3 wherein the nickel metal is repeatedly anodically charged for from about 1 to about 20 seconds then cathodically charged for about one to about 20 seconds for a total time period of about 10 minutes.

6. A process according to claim 5 wherein after galvanostatic cycling the nickel metal is anodically charged for from about 1 minute to about 10 minutes.

7. A process according to claim 1 wherein the surface coating on the nickel metal is at least about 100 monolayer equivalents thick.

8. A process according to claim 7 wherein the surface coating on the nickel metal is at least about 150 monolayer equivalents thick.

9. A nickel-oxide hydroxide electrode prepared according to the process of claim 1.

* * * * *